(12) United States Patent
Akiyama et al.

(10) Patent No.: US 11,260,760 B2
(45) Date of Patent: Mar. 1, 2022

(54) FUEL CELL VEHICLE

(71) Applicant: TOYOTA JIDOSHA KABUSHIKI KAISHA, Toyota (JP)

(72) Inventors: Tadashi Akiyama, Okazaki (JP); Minetaka Kawamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 16/663,785

(22) Filed: Oct. 25, 2019

(65) Prior Publication Data
US 2020/0130517 A1    Apr. 30, 2020

(30) Foreign Application Priority Data
Oct. 29, 2018 (JP) .............................. JP2018-202791

(51) Int. Cl.
*B60K 1/00*     (2006.01)
*B60L 50/71*    (2019.01)
*H01M 8/2475*   (2016.01)
*B60L 50/72*    (2019.01)
*B62D 21/15*    (2006.01)

(52) U.S. Cl.
CPC .............. *B60L 50/71* (2019.02); *B60L 50/72* (2019.02); *H01M 8/2475* (2013.01); *B60Y 2200/91* (2013.01); *B60Y 2400/202* (2013.01); *B62D 21/152* (2013.01); *H01M 2250/20* (2013.01)

(58) Field of Classification Search
CPC .......... B60L 50/71; B60L 50/72; B60L 50/70; B60L 3/00; B60L 3/0007; B60Y 2400/202; B60Y 2200/91; B62D 21/152; B62D 21/15; B62D 21/00; H01M 8/2475; H01M 8/04029; H01M 8/04; H01M 8/2465;
(Continued)

(56) References Cited

U.S. PATENT DOCUMENTS 8,985,259 B2 * 3/2015 Ozawa ................. B60L 3/0053
                                                         180/292
9,079,508 B2 * 7/2015 Naito ................. H01M 8/04089
(Continued)

FOREIGN PATENT DOCUMENTS

JP    2003-173790 A    6/2003
JP    2012035744 A     2/2012
(Continued)

*Primary Examiner* — James M Dolak
(74) *Attorney, Agent, or Firm* — Sughrue Mion, PLLC (57) ABSTRACT

There is provided a fuel cell vehicle that allows minimally suppressing damage of a fuel cell stack and a high voltage component as important components when the vehicle collides from a front side. An ion exchanger as a first component includes a tubular portion and a cap portion. When the front side of the fuel cell vehicle collides, the tubular portion deforms due to an impact load from a radiator as a second component moving toward the ion exchanger to buffer an impact from the radiator. The cap portion restricts additional deformation of a damper portion when the impact load from the radiator becomes a predetermined magnitude or more. A stack frame and a chassis are joined and fixed via mounts such that the stack frame is detached from the chassis due to the impact load from the radiator when the deformation of the tubular portion is restricted by the cap portion.

2 Claims, 5 Drawing Sheets

(58) Field of Classification Search
CPC ...... H01M 8/24; H01M 8/00; H01M 2250/20; H01M 2008/1095
See application file for complete search history.

(56) References Cited

U.S. PATENT DOCUMENTS

| | | | |
|---|---|---|---|
| 9,260,034 B2* | 2/2016 | Naito | B60L 3/0007 |
| 9,333,845 B2* | 5/2016 | Winter | B60K 1/04 |
| 9,371,009 B2* | 6/2016 | Ishikawa | H01M 8/2483 |
| 9,586,499 B2* | 3/2017 | Fushimi | B60L 50/70 |
| 9,789,755 B2* | 10/2017 | Aishima | B60L 50/70 |
| 9,941,495 B2* | 4/2018 | Naito | H01M 8/241 |
| 9,981,693 B2* | 5/2018 | Murata | B62D 21/15 |
| 10,414,351 B2* | 9/2019 | Katano | B60L 50/51 |
| 10,654,367 B2* | 5/2020 | Ichida | B60L 50/71 |
| 10,730,379 B2* | 8/2020 | Tambo | B60L 3/0053 |
| 11,040,629 B2* | 6/2021 | Sakakibara | H01M 8/04029 |
| 2003/0108784 A1 | 6/2003 | Enjoji et al. | |
| 2017/0101031 A1 | 4/2017 | Ohashi | |
| 2017/0297513 A1 | 10/2017 | Katano | |

FOREIGN PATENT DOCUMENTS

| | | |
|---|---|---|
| JP | 2017074819 A | 4/2017 |
| JP | 2017-190090 A | 10/2017 |

\* cited by examiner

FUEL CELL VEHICLE

CROSS REFERENCE TO RELATED APPLICATIONS

The present application claims priority from Japanese patent application JP 2018-202791 filed on Oct. 29, 2018, the content of which is hereby incorporated by reference into this application.

BACKGROUND

Technical Field

The present disclosure relates to a fuel cell vehicle to which a fuel cell system is mounted.

Background Art

A conventional fuel cell vehicle includes a fuel cell stack and a high voltage component such as a power control unit (PCU) arranged in a front compartment on the front side of the vehicle. The fuel cell stack is fixed to a stack frame, and the high voltage component is arranged on an upper portion of the fuel cell stack (for example, see JP 2017-190090 A).

SUMMARY

However, for example, in the case of a collision from the front side of the fuel cell vehicle with the above-described structure, the fuel cell stack and the high voltage component could be squashed due to deformation of the vehicle, possibly resulting in damage. In the fuel cell vehicle, since the fuel cell stack and the high voltage component to which electric power is supplied from the fuel cell stack are components important to drive the vehicle, damage at a collision is desirably reduced as much as possible.

The present disclosure provides a fuel cell vehicle that allows minimally suppressing damage of a fuel cell stack and a high voltage component as important components when the vehicle collides from a front side.

In view of the above-described problem, a fuel cell vehicle according to the present disclosure includes a fuel cell stack, a high voltage component, a first component, and a second component housed in a front compartment on a front side of the vehicle. The high voltage component is disposed on an upper portion of the fuel cell stack from which electric power is supplied. The first component is mounted to the fuel cell stack. The second component is disposed with a space from the first component on a front side of the vehicle with respect to the first component. The fuel cell stack is placed on and fixed to a stack frame fixed inside the front compartment. The stack frame is joined and fixed to a chassis of the fuel cell vehicle via a mount. The first component includes a damper portion and a high rigidity portion. The damper portion deforms due to an impact load from the second component moving toward the first component to buffer the impact load from the second component when a front side of the fuel cell vehicle collides. The high rigidity portion restricts additional deformation of the damper portion when the impact load from the second component becomes equal to or more than a predetermined magnitude. The stack frame and the chassis are joined and fixed via the mount such that the stack frame is detached from the chassis due to the impact load from the second component when the high rigidity portion restricts the deformation of the damper portion.

With the fuel cell vehicle of the present disclosure configured as described above, when the vehicle collides from the front side, the impact load due to, for example, the collision deforms the vehicle body, and the second component inside the front compartment on the front side of the vehicle moves rearward due to the impact. With a small impact load (an amount of movement is small), the damper portion of the first component deforms to reduce the impact.

On the other hand, with the large impact load (the amount of movement is large), the stack frame where the fuel cell stack is placed and fixed is detached from the chassis. This allows avoiding the fuel cell stack and the high voltage component to receive all the impact loads from the second component together with the stack frame. Consequently, damage of the fuel cell stack and the high voltage component disposed on the upper portion of the fuel cell stack can be minimized.

Here, as described above, as long as the damper portion deforms when the impact load acts, a positional relationship between the damper portion and the mount is not specifically limited. However, in some embodiments, the damper portion and the mount are disposed such that the damper portion contacts the second component prior to the mount at the collision. With this aspect, the second component contacts the damper portion prior to the mount at the movement, thereby ensuring suppressing the mount from being damaged prior to damage of the damper portion. Accordingly, after the damper portion buffers the impact load, the stack frame can be detached from the chassis.

The fuel cell vehicle of the present disclosure can suppress breakage and the deformation of the fuel cell stack and the high voltage component when the vehicle collides from the front side.

DETAILED DESCRIPTION

Figure 1:
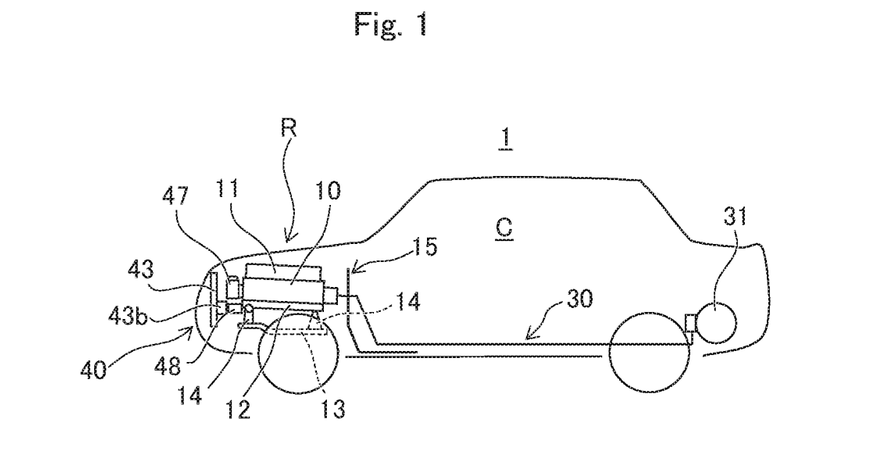
FIG. 1 is a schematic diagram illustrating a configuration of a main part of a fuel cell vehicle according to one embodiment of the present disclosure.

The following describes one embodiment of a fuel cell vehicle according to the present disclosure in detail with reference to the drawings. FIG. 1 is a schematic diagram illustrating a configuration of a main part of the fuel cell vehicle according to the embodiment.

First, the fuel cell vehicle according to the present disclosure will be described with reference to FIG. 1. In FIG. 1, a fuel cell vehicle 1 is a vehicle such as a passenger car, and has a front compartment R on its front side of the vehicle. The front compartment R houses a fuel cell stack 10, a high voltage component 11 disposed on an upper portion of the fuel cell stack 10, an ion exchanger 47 as an accessory attached to the fuel cell stack 10, an auxiliary component such as a radiator 43, and the like. The ion exchanger 47 and the radiator 43 constitute a cooling system 40 of a fuel cell system 1A described later. Besides, components required for the fuel cell system 1A, such as a compressor, a gas-liquid separator, and a hydrogen pump (not illustrated) are housed inside the front compartment R.

The high voltage component 11 is fixed to the upper portion of the fuel cell stack 10, coupled to the fuel cell stack 10 with a high-voltage cable and a control cable, and supplied with electric power generated in the fuel cell stack 10, and has a function to control the fuel cell stack 10. The high voltage component 11 includes a power control unit (PCU) of the fuel cell vehicle. The fuel cell stack 10 and the high voltage component 11 constitute important components of the fuel cell system 1A, and, as described later, locations of them and the like are considered so as not to cause damage, such as breakage and deformation, due to a collision or a similar accident.

Figure 5:
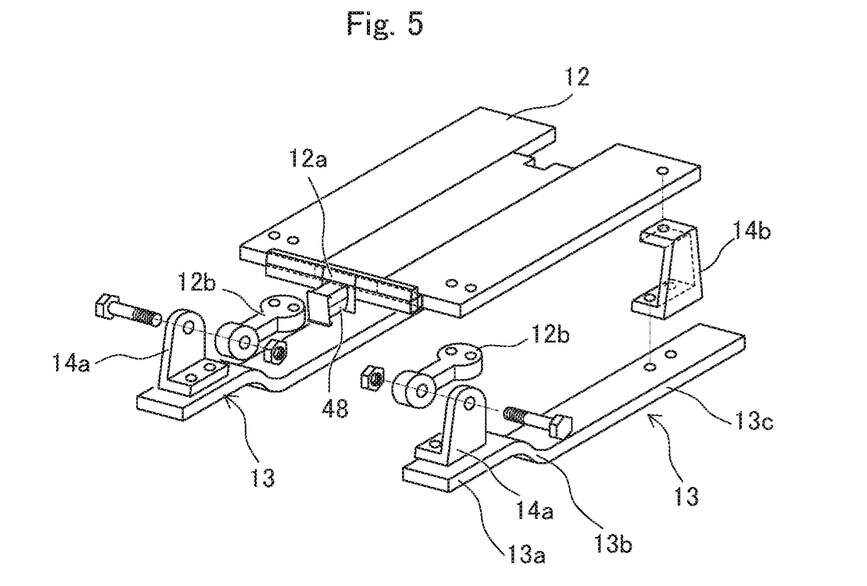
FIG. 5 is a perspective view illustrating a configuration of the main part of FIG. 3 and FIG. 4.

The fuel cell stack 10 is placed on and fixed to a stack frame 12 fixed inside the front compartment R. The stack frame 12 is fixed to chassis 13 as structural members of a vehicle body via mounts 14. In the embodiment, as illustrated in FIG. 5 described later, the chassis 13 has a front horizontal portion 13a on the front side, an inclined portion 13b inclined downward from the front horizontal portion toward the rear, and a rear horizontal portion 13c extending from the inclined portion toward the rear. Additionally, the stack frame 12 is fixed such that its rear side is inclined downward with respect to the horizontal portions of the chassis 13.

Figure 4:
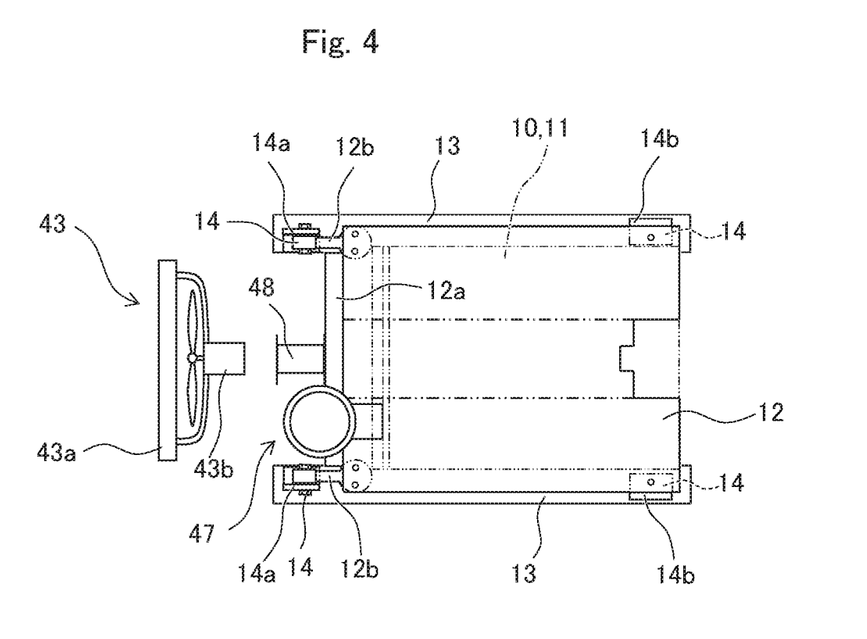
FIG. 4 is a main part schematic diagram illustrating a planar surface of FIG. 3.

As illustrated in FIG. 4, the mounts 14, which fix the stack frame 12 to the chassis 13, are disposed at four positions on the front and the rear. A front mount 14a is fixed to the front horizontal portion 13a and supports the front portion of the stack frame 12 via a mount arm 12b, which is fixed to the front portion of the stack frame 12. A rear mount 14b is fixed to the rear horizontal portion 13c and supports the rear portion of the stack frame 12. Since the stack frame 12 is supported at four points by the front and rear mounts 14, the fixed state is stable.

The front mount 14a and the rear mount 14b are mounted and fixed to the chassis 13 with fastening members, such as bolts. The mount arm 12b is fixed to the stack frame 12 with a fastening member, such as a bolt, the mount arm 12b and the front mount 14a are also joined and fixed with a fastening member, such as a bolt. Although details will be described later, joining of the front mount 14a and the rear mount 14b with the chassis 13 is structured to be detached by, for example, a magnitude of an impact load at a collision. The fuel cell vehicle 1 includes a dash panel 15 that separates the front compartment R from a cabin C.

Figure 2:
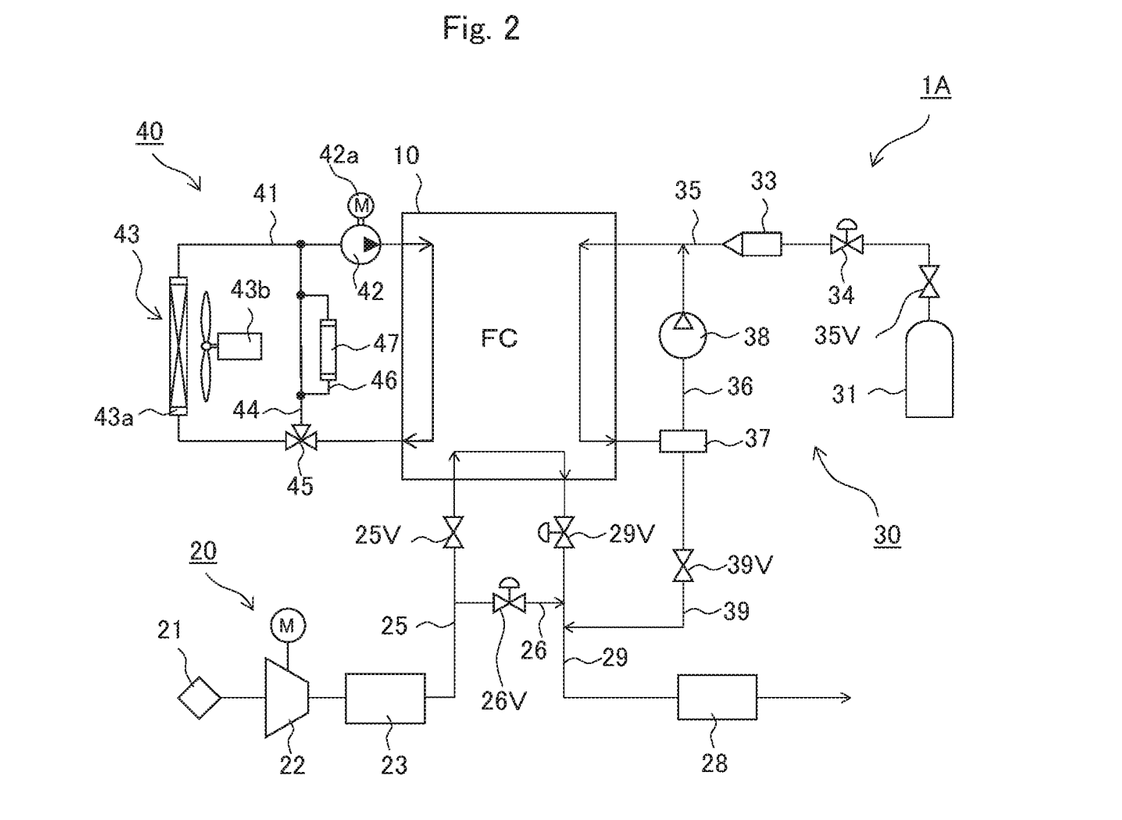
FIG. 2 is a system configuration diagram of a fuel cell system used for the fuel cell vehicle illustrated in FIG. 1.

Next, the system configuration of the fuel cell system 1A used in the fuel cell vehicle 1 according to the embodiments will be described with reference to FIG. 2. The fuel cell system 1A illustrated in FIG. 2 includes, for example, a fuel cell (fuel cell stack) 10, an oxidant gas supply system 20, a fuel gas supply system 30, and the cooling system 40. The fuel cell (fuel cell stack) 10 includes a plurality of stacked cells for fuel cell as unit cells. The oxidant gas supply system 20 supplies the fuel cell stack 10 with an oxidant gas such as air. The fuel gas supply system 30 supplies the fuel cell stack 10 with a fuel gas such as hydrogen. The cooling system 40 cools the fuel cell stack 10.

For example, the cell for fuel cell of the solid polymer fuel cell stack 10 includes a Membrane Electrode Assembly (MEA), which includes an ion permeable electrolyte membrane, an anode side catalyst layer (anode electrode), and a cathode side catalyst layer (cathode electrode). The electrolyte membrane is sandwiched between the anode side catalyst layer and the cathode side catalyst layer. The MEA has both sides on which Gas Diffusion Layers (GDL) are formed to supply the fuel gas or the oxidant gas and collect electricity generated through an electrochemical reaction. The Membrane Electrode Assembly having both sides on which the GDLs are disposed is referred to as a Membrane Electrode & Gas Diffusion Layer Assembly (MEGA), and the MEGA is sandwiched by a pair of separators. Here, the MEGA serves as a power generation unit of the fuel cell, and when the gas diffusion layer is not disposed, the MEA serves as the power generation unit of the fuel cell.

The oxidant gas supply system 20 includes, for example, an oxidant gas supply passage 25 and an oxidant gas discharge passage 29. The oxidant gas supply passage 25 supplies (the cathode electrode of) the fuel cell stack 10 with the oxidant gas. The oxidant gas discharge passage 29 discharges an oxidant off-gas, in which the oxidant gas has been supplied to the fuel cell stack 10 and has been used for the electrochemical reaction in each of the cells for fuel cell, from the fuel cell stack 10. Furthermore, a bypass passage 26 is disposed to flow the oxidant gas supplied via the oxidant gas supply passage 25 to the oxidant gas discharge passage 29 without via the fuel cell stack 10. The passages of the oxidant gas supply system 20 can be each formed of a pipe such as a rubber hose and a metallic pipe.

The oxidant gas supply passage 25 includes, for example, an air cleaner 21, a compressor 22, and an intercooler 23 from an upstream side, and the oxidant gas discharge passage 29 includes, for example, a muffler 28. (The air cleaner 21 of) the oxidant gas supply passage 25 includes, for example, an atmospheric pressure sensor and an air flow meter, which are not illustrated.

On the oxidant gas supply passage 25, the air cleaner 21 removes dust in the oxidant gas (air and the like) taken from the atmosphere. The compressor 22 compresses the oxidant gas taken in via the air cleaner 21 and pressure-feeds the compressed oxidant gas to the intercooler 23. The intercooler 23 cools the oxidant gas, which is pressure-fed from the compressor 22 and taken in through, for example, a heat exchange with a coolant to supply to (the cathode electrode of) the fuel cell stack 10 when the oxidant gas passes through. The oxidant gas supply passage 25 includes an inlet valve 25V to shut off the flow of the oxidant gas between the intercooler 23 and the fuel cell stack 10.

The bypass passage 26 has one end coupled to (the intercooler 23 or its downstream side of) the oxidant gas supply passage 25, and the other end coupled to the oxidant gas discharge passage 29. The oxidant gas that has been pressure-fed by the compressor 22 and has been cooled and discharged by the intercooler 23 flows through the bypass passage 26 toward the oxidant gas discharge passage 29 while bypassing the fuel cell stack 10. This bypass passage 26 includes a bypass valve 26V that shuts off the oxidant gas flowing toward the oxidant gas discharge passage 29 to adjust a flow rate of the oxidant gas flowing through the bypass passage 26.

On the oxidant gas discharge passage 29, the muffler 28 separates the oxidant off-gas (exhaust gas) flowing into the oxidant gas discharge passage 29 into, for example, a gas phase and a liquid phase to discharge outside. The oxidant gas discharge passage 29 includes a pressure regulating valve 29V to regulate a back-pressure of the oxidant gas supplied to the fuel cell stack 10. The above-described bypass passage 26 is coupled to a downstream side of the pressure regulating valve 29V.

Meanwhile, the fuel gas supply system 30 includes, for example, a fuel gas supply source 31 such as a hydrogen tank, a fuel gas supply passage 35, a circulation passage 36, and a fuel gas discharge passage 39. The fuel gas supply source 31 stores a high pressure fuel gas such as hydrogen. The fuel gas supply passage 35 supplies the fuel gas from the fuel gas supply source 31 to (the anode electrode of) each cell for fuel cell. The circulation passage 36 recirculates a part of the fuel off-gas (unconsumed fuel gas) discharged from the fuel cell stack 10 to the fuel gas supply passage 35. The fuel gas discharge passage 39 is branched and coupled to the circulation passage 36 to discharge the fuel off-gas inside the circulation passage 36 to the outside (atmospheric release). The passages of the fuel gas supply system 30 can be each formed of a pipe such as a rubber hose and a metallic pipe.

The fuel gas supply passage 35 includes a shut-off valve 35V, a regulator 34, and an injector 33. The shut-off valve 35V opens and closes the fuel gas supply passage 35 to shut off the fuel gas flowing toward the fuel cell stack 10. The regulator 34 regulates (decompresses) a pressure of the fuel gas flowing through the fuel gas supply passage 35. The injector 33 supplies the fuel gas whose pressure has been regulated toward the fuel cell stack 10. Opening the shut-off valve 35V causes the high pressure fuel gas stored in the fuel gas supply source 31 to flow into the fuel gas supply passage 35 from the fuel gas supply source 31, and the high pressure fuel gas is supplied to (the anode electrode of) each cell for fuel cell with the pressure regulated (decompressed) by the regulator 34 and the injector 33.

The circulation passage 36 includes a gas-liquid separator 37, a fuel gas pump (hydrogen pump in other words) 38, and similar unit from an upstream side (fuel cell stack 10 side). The gas-liquid separator 37 performs gas-liquid separation to store generated water contained in the fuel gas (for example, hydrogen) flowing through the circulation passage 36. The fuel gas discharge passage 39 branches from this gas-liquid separator 37. The fuel gas pump 38 pressure-feeds a part of the fuel off-gas from which the liquid component has been separated through the gas-liquid separation by the gas-liquid separator 37 to circulate into the fuel gas supply passage 35.

The fuel gas discharge passage 39 includes a purge valve 39V that opens and closes the fuel gas discharge passage 39 to discharge the generated water separated by the gas-liquid separator 37 and a part of the fuel off-gas discharged from the fuel cell stack 10. The fuel off-gas is discharged through the opening/closing adjustment by the purge valve 39V of the fuel gas discharge passage 39, mixed with the oxidant off-gas flowing through the oxidant gas discharge passage 29, and released outside into the atmosphere via the muffler 28.

The fuel cell system 1A having the above-described configuration performs the electric generation through the electrochemical reaction between the oxidant gas such as air supplied to (the cathode electrode of) each cell for fuel cell by the oxidant gas supply system 20 and the fuel gas such as hydrogen supplied to (the anode electrode of) each cell for fuel cell by the fuel gas supply system 30. A temperature rise in the fuel cell stack 10 caused by an electrochemical reaction during electric generation is controlled to be a predetermined temperature by the cooling system 40.

The cooling system 40, which cools each cell for fuel cell, includes a coolant passage 41 communicated with a cooling passage inside the fuel cell stack 10, and a cooling pump 42 and a motor (pump motor) 42a, which are disposed in the coolant passage 41. The cooling system 40 includes the radiator 43 that cools a coolant discharged from the fuel cell stack 10 and a fan motor 43b that cools a heat dissipation unit 43a of the radiator 43. Furthermore, the cooling system 40 includes a bypass passage 44 that bypasses the radiator 43, a three-way valve 45 that controls a distribution of cooling water of the radiator 43 and the bypass passage 44, and the ion exchanger 47 disposed on a cooling pipe 46, which is disposed parallel to the bypass passage 44. By driving the motor 42a, the cooling pump 42 circulates and supplies the coolant inside the coolant passage 41 to the fuel cell stack 10. The ion exchanger 47 has a function to remove ions from the coolant cooling the fuel cell stack 10.

Figure 3:
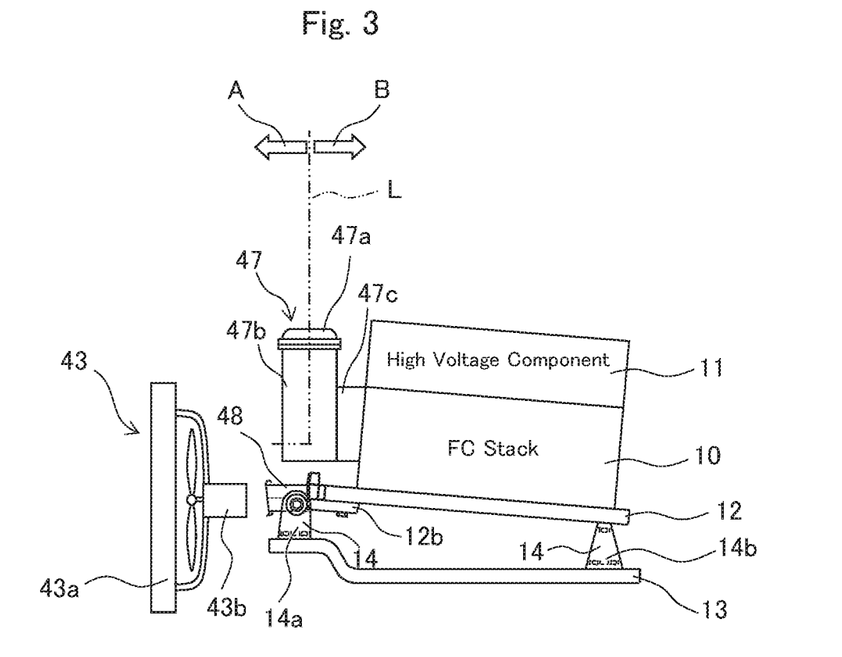
FIG. 3 is a main part schematic diagram illustrating a side surface of a main part of the fuel cell vehicle illustrated in FIG. 1.

Next, the following describes features and configurations of the fuel cell vehicle 1 according to the embodiment in detail with reference to FIG. 3 to FIG. 5. The fuel cell vehicle 1 of the embodiment includes the fuel cell stack 10, the high voltage component 11 disposed on the upper portion of the fuel cell stack 10 from which electric power is supplied inside the front compartment R on the front side of the vehicle. The fuel cell vehicle 1 further includes the ion exchanger 47 mounted to the fuel cell stack 10 and the radiator 43 disposed on the vehicle front side with respect to the ion exchanger 47 with a space from the ion exchanger 47 inside the front compartment R.

Note that the ion exchanger 47 is equivalent to a "first component" of the present disclosure and the radiator 43 is equivalent to a "second component" of the present disclosure. Although not illustrated, the compressor 22 and the fuel gas pump 38 illustrated in FIG. 2 are mounted to the lower portion of the stack frame 12 via a compressor bracket or the like on the vehicle front side.

More specifically, the fuel cell stack 10 is mounted to the upper portion of the stack frame 12 and fixed with a fastening member such as a bolt. The high voltage component 11 is disposed on the upper portion of the fuel cell stack 10 and fixed with a bolt or the like. The fuel cell stack 10 and the high voltage component 11 are coupled with a high-voltage cable, a control cable, or a similar cable. The ion exchanger 47 (first component) constituting the cooling system 40 is fixed to a surface of the fuel cell stack 10 on the vehicle front side with a fastening member such as a bolt and fixed projecting forward from the fuel cell stack 10. The ion exchanger 47 is installed parallel to the coolant passage 41 of the cooling system 40 and installed between the high voltage component 11 and the heat dissipation unit 43a of the radiator 43.

The ion exchanger 47 is a member molded with resin or a similar material and includes a cap portion 47a on the upper portion and a tubular portion 47b with a bottom on the lower portion. The cap portion 47a is fixed to the tubular portion 47b via a fastening member such as a bolt so as to cover an opening of the tubular portion 47b. The tubular portion 47b and the cap portion 47a have spaces inside of which a coolant for cooling circulates. The tubular portion 47*b* is fixed to a stack case of the fuel cell stack 10 with a mounting portion 47*c* with a joining bolt or the like.

The tubular portion 47*b* is a damper portion that deforms due to the impact load from the radiator 43 moving toward the tubular portion 47*b* at the collision on the front side of the fuel cell vehicle 1 described later to buffer the impact load from the radiator 43.

Meanwhile, the cap portion 47*a* is a high rigidity portion (deformation restricting portion) that restricts (regulates) additional deformation of the tubular portion 47*b* when the impact load from the radiator 43 becomes a predetermined magnitude or more at the collision on the front side of the fuel cell vehicle 1. Specifically, the cap portion 47*a* has rigidity higher than that of an ordinary ion exchanger, and the cap portion 47*a* fixed to the tubular portion 47*b* suppresses the additional deformation of the tubular portion 47*b* by the radiator 43.

That is, as illustrated in FIG. 3, with a division line L as a border, a region A of the ion exchanger 47 on the vehicle front side with respect to the division line L becomes a buffer region (deformation region) deforming so as to buffer the impact load from the radiator 43. Meanwhile, a region B of the ion exchanger 47 on the vehicle rear side with respect to the division line L becomes a high rigidity region where the tubular portion 47*b* does not additionally deform brought by the rigidity of the cap portion 47*a* even when the impact load from the radiator 43 acts any further.

Instead that the tubular portion 47*b* does not deform any further due to the impact load in the region B, as described later, due to the impact load from the radiator 43, the stack frame 12 is detached from the chassis 13, thus ensuring releasing the impact load from the radiator 43 to the fuel cell stack 10.

In the embodiment, breaking strength (strength at which plastic deformation starts) of the cap portion 47*a* due to the impact load in a horizontal direction is higher than breaking strength (the strength at which the plastic deformation starts) of the tubular portion 47*b*. That is, since the breaking strength of the cap portion 47*a* is larger than the breaking strength of the tubular portion 47*b*, the cap portion 47*a* is less likely to be smashed compared with the tubular portion 47*b*. For example, the breaking strength of the tubular portion 47*b* is set to a value of 10 KN or less, and the breaking strength of the cap portion 47*a* is set to a value higher than 100 KN.

As described above, the radiator 43, which is positioned on the front side in the front compartment R of the vehicle, is the auxiliary component of the fuel cell system 1A and includes the heat dissipation unit 43*a* and the fan motor 43*b*. Rotatably driving the fan motor 43*b* and dissipating the heat of the coolant whose temperature has risen through the circulation inside the fuel cell stack 10 from the heat dissipation unit 43*a* suppress the temperature rise of the fuel cell stack 10. The fan motor 43*b* projects in a direction of the stack frame 12 at the rear of the heat dissipation unit 43*a*.

As illustrated in FIG. 4 and FIG. 5, the stack frame 12 is configured by welding three metal plate materials. The right and left plate materials are formed long, and the center plate material is formed short, and a front beam material 12*a* extending in a vehicle-width direction is joined to the front end portions by welding or the like. While the three metal plate materials are formed of an aluminum extruded material in the embodiment, the material is not limited to aluminum.

Further, as illustrated in FIG. 3, the stack frame 12 may be inclined downward from the front side of the vehicle to the rear side of the vehicle. Thus, when the impact load from the radiator 43 acts the fuel cell stack 10 via the ion exchanger 47, a moment acts on the mount 14 fixed to the stack frame 12. Accordingly, the stack frame 12 can be detached from the chassis 13 so as to release the impact load acting on the fuel cell stack 10 from the radiator 43.

In the embodiment, a crash box 48 projects from the front beam material 12*a* of the stack frame 12 toward the front side of the vehicle and is fixed. The fan motor 43*b* of the radiator 43 separates from the crash box 48 and is disposed so as to be opposed to the crash box 48 on the vehicle rear side. The crash box 48 has a structure that squashes and deforms when receiving the above-described impact load to absorb the impact load and is formed into a box shape made of resin or made of metal.

In the embodiment, as described above, the mount 14 and the chassis 13 have the structures detached by, for example, the magnitude of the impact load at the collision. Specifically, the chassis 13 are constituted of the two members extending parallel in a front-rear direction of the vehicle body, the front mount 14*a* is fixed to the front side of the one of the chassis 13 with bolts or the like, and the rear mount 14*b* is fixed to the rearward with bolts or the like. To the upper portion of the front mount 14*a*, the front portion of the mount arm 12*b*, which projects forward from the stack frame 12 and is fixed, is joined with a bolt or the like. To the upper portions of the rear mounts 14*b*, the rear portion of the stack frame 12 is fixed.

Furthermore, the stack frame 12 and the chassis 13 are joined and fixed via the mounts 14 such that the stack frame 12 is detached from the chassis 13 due to the impact load from the radiator 43 when the cap portion 47*a* restricts the deformation of the tubular portion 47*b*.

Specifically, in the embodiment, applying the impact load of a certain magnitude or more to from the radiator 43 to the mounts 14 disengages the joining between the front mount 14*a* and the chassis 13 and the joining between the rear mount 14*b* and the chassis 13. For example, mounting strength of the stack frame 12 with the chassis 13 (that is, strength at which the state of joining and fixing the stack frame 12 to the chassis 13 can be maintained) is set higher than the above-described breaking strength of the tubular portion 47*b* and smaller than the above-described breaking strength of the cap portion 47*a*, and set to, for example, 100 KN.

As long as the stack frame 12 is detached from the chassis 13, the joining between the front mounts 14*a* and the mount arms 12*b* may be disengaged or the joining between the mount arms 12*b* and the stack frame 12 may be disengaged. Alternatively, the joining between the rear mounts 14*b* and the stack frame 12 may be disengaged.

Furthermore, the tubular portion 47*b* of the ion exchanger 47 and the mounts 14 are disposed such that the tubular portion 47*b* of the ion exchanger 47 contacts the radiator 43 prior to the mounts 14 (specifically, the front mounts 14*a*) at the collision on the front side of the fuel cell vehicle 1. When the radiator 43 moves rearward of the vehicle, the radiator 43 contacts the tubular portion 47*b* prior to the mounts 14. This allows suppressing the mounts 14 from being damaged before the tubular portion 47*b* is damaged. Accordingly, after the tubular portion 47*b* buffers the impact load, the stack frame 12 can be detached from the chassis 13.

The following describes an action of the fuel cell vehicle of the embodiment configured as described above with reference to FIG. 6 to FIG. 9. FIG. 6 to FIG. 9 illustrate first to fourth moving states of the radiator 43 when the fuel cell vehicle 1 collides from the front side. Since FIG. 6 to FIG.

9 schematically illustrate locations of the components and the like inside the front compartment R, the detailed configuration is omitted.

Figure 6:
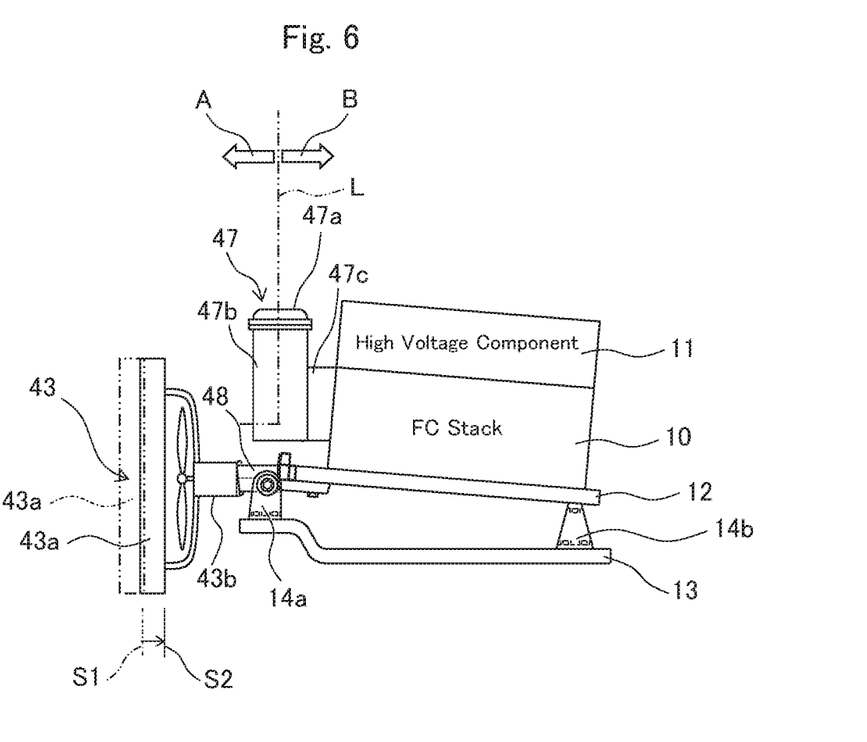
FIG. 6 is an explanatory view of an operation of the fuel cell vehicle of the embodiment and a main part schematic diagram corresponding to FIG. 3 illustrating a first moving state of a radiator.

When the fuel cell vehicle 1 collides with, for example, an obstacle or the like, the front compartment R of the vehicle is squashed to deform, and the radiator 43 moves rearward toward the fuel cell stack 10, the high voltage component 11, and the ion exchanger 47 by the obstacle. Thus, the radiator 43 approaches the fuel cell stack 10, the high voltage component 11, and the ion exchanger 47 fixed to the stack frame 12 as illustrated in FIG. 6. FIG. 6 illustrates the first moving state in which the radiator 43 moves rearward from an initial position S1 illustrated in FIG. 3 to a second position S2. At this phase, the fan motor 43b abuts on the crash box 48.

Figure 7:
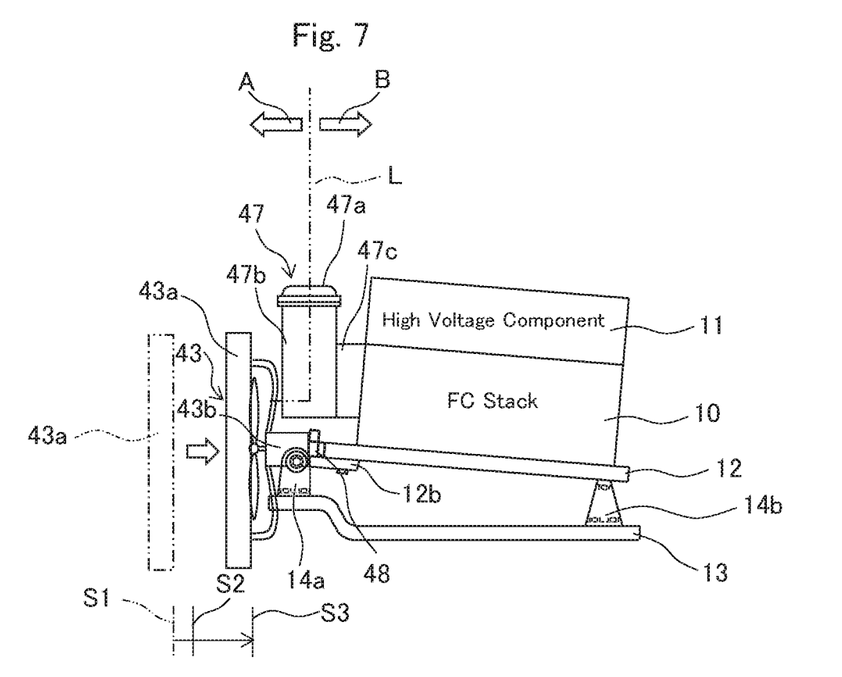
FIG. 7 is an explanatory view of an operation of the fuel cell vehicle of the embodiment and a main part schematic diagram corresponding to FIG. 3 illustrating a second moving state of the radiator.

As illustrated in FIG. 6, with the extremely small impact load, the deformation of the body or the like buffers the impact load at the second position S2 of the radiator 43. With the slightly large impact load, as illustrated in FIG. 7, the radiator 43 additionally moves rearward up to a third position S3, and the fan motor 43b of the radiator 43 also moves rearward. Accordingly, the fan motor 43b squashes and deforms the crash box 48. The deformation of this crash box 48 allows buffering (absorbing) the impact load from the radiator 43 from the vehicle front side.

Figure 8:
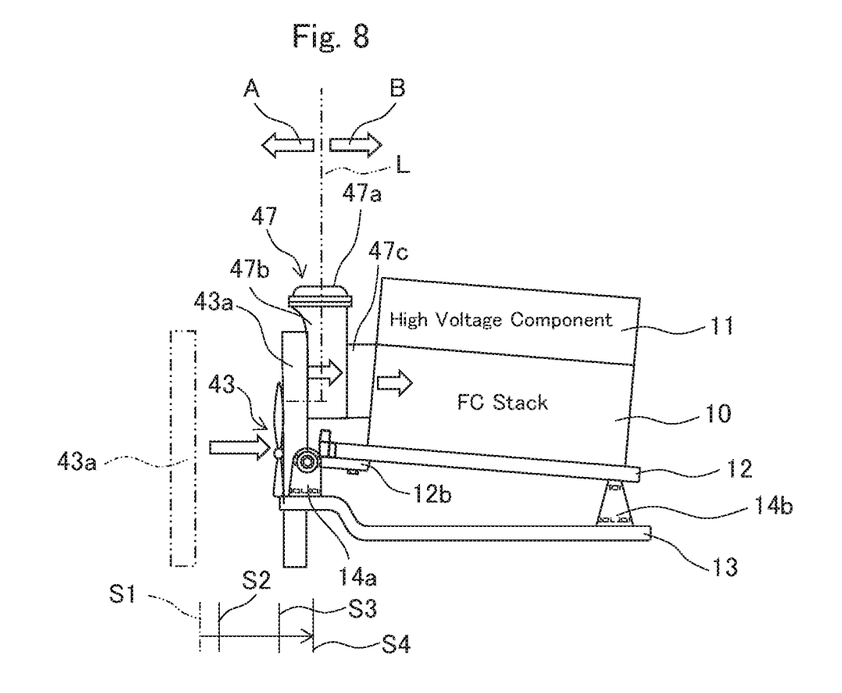
FIG. 8 is an explanatory view of an operation of the fuel cell vehicle of the embodiment and a main part schematic diagram corresponding to FIG. 3 illustrating a third moving state of the radiator.

With the larger impact load, the impact load cannot be absorbed by the deformation of the crash box 48, and as illustrated in FIG. 8, (the heat dissipation unit 43a of) the radiator 43 is in contact and deforms the tubular portion 47b of the ion exchanger 47 to buffer (absorb) the impact load from the radiator 43 by the tubular portion 47b. In FIG. 8, the radiator 43 further retreats from the state of FIG. 7 and moves to a fourth position S4. In this state, although the tubular portion 47b of the ion exchanger 47 is in the deformed state, the tubular portion 47b further has a deformation margin up to the division line L. FIG. 8 illustrates a third moving state of the radiator 43. Note that when the radiator 43 moves rearward of the vehicle, since the radiator 43 contacts the tubular portion 47b prior to the mounts 14, the damage of the mounts 14 before the tubular portion 47b is damaged can be suppressed.

With the further larger impact load, the radiator 43 additionally moves, and the tubular portion 47b of the ion exchanger 47 additionally deforms up to the division line L. However, the tubular portion 47b includes the cap portion 47a, and the configuration of this cap portion 47a does not deform the tubular portion 47b any further. The impact load from the radiator 43 that cannot be fully buffered by the tubular portion 47b presses the fuel cell stack 10 rearward via the mounting portion 47c of the ion exchanger 47.

The impact load from the fuel cell stack 10 is transmitted to the stack frame 12 and is transmitted to the front and rear mounts 14a and 14b, which join and fix the stack frame 12 to the chassis 13. This applies a load of a certain magnitude or more to the mounts 14 and disengages the joining between the stack frame 12 and the chassis 13.

Figure 9:
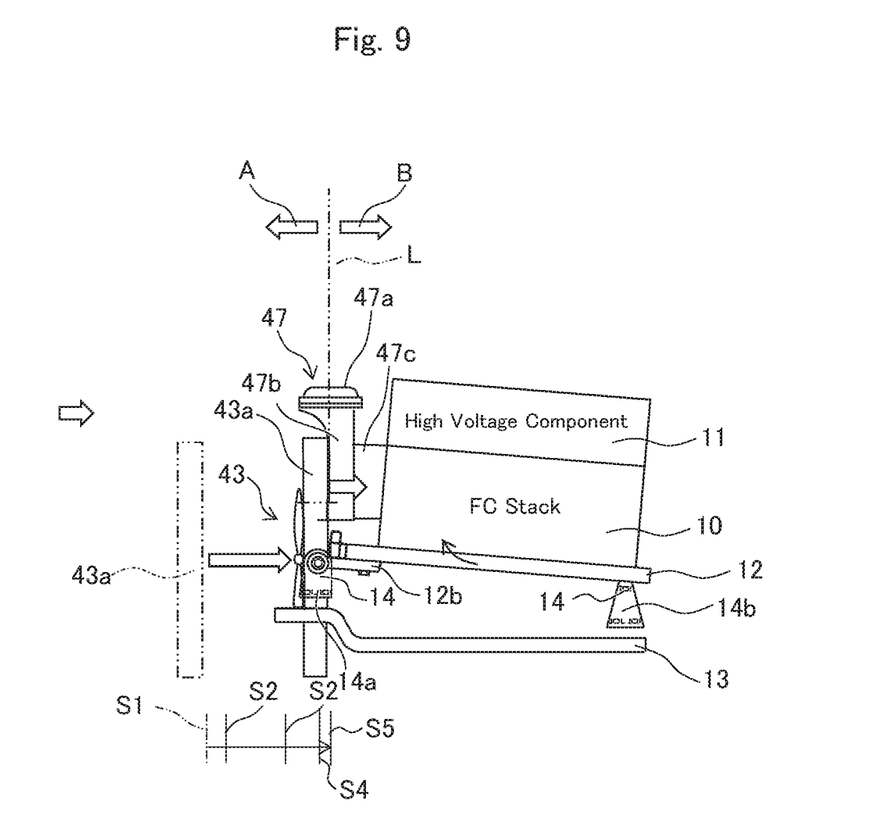
FIG. 9 is an explanatory view of an operation of the fuel cell vehicle of the embodiment and a main part schematic diagram corresponding to FIG. 3 illustrating a fourth moving state of the radiator.

Thus, the fuel cell stack 10 placed on and fixed to the stack frame 12 and the high voltage component 11 fixed upward the fuel cell stack 10 are detached from the chassis 13, becoming free inside the front compartment R. Consequently, directly acting the impact load from the radiator 43 on the fuel cell stack 10 or the like can be avoided. In this respect, the radiator 43 is in a state of a fifth position S5 illustrated in FIG. 9. FIG. 9 illustrates the fifth moving state.

Thus, with fuel cell vehicle 1, for example, when the vehicle front portion is damaged by the collision from the front side, an amount of movement of the radiator 43 to the rear of the vehicle changes depending on the magnitude of the impact load. With the small impact load, the radiator 43 moves from the initial position S1 to the second position S2 (see FIG. 6) and buffers. With the further larger impact load, the auxiliary component such as the radiator 43 moves up to the third position S3 (see FIG. 7), and the crash box 48 deforms to smash.

With the further larger impact load, the radiator 43 retreats up to the fourth position S4 (see FIG. 8), and the tubular portion 47b of the ion exchanger 47 deforms to buffer the impact load. When the impact load becomes equal to or more than a predetermined load, the cap portion 47a restricts the additional deformation of the tubular portion 47b. The impact load from the radiator 43 is transmitted from the fuel cell stack 10 to the mounts 14 via the mounting portion 47c of the ion exchanger 47, and the stack frame 12 is detached from the chassis 13 by this pressing force (see FIG. 9).

Accordingly, the fuel cell stack 10 and the high voltage component 11 disposed and fixed on the upper portion of the fuel cell stack 10 become free from the chassis 13 together with the stack frame 12 and therefore are released from the impact load due to the retreat of the auxiliary component such as the radiator 43 caused by the collision or a similar accident, thus suppressing deformation and damage.

That is, while the auxiliary component such as the radiator 43 is at from the initial position S1 to the fourth position S4, the deformation of the crash box 48, the deformation of the tubular portion 47b of the ion exchanger 47, and the like buffer the impact load from the radiator 43. In the state of the fifth position S5, the joining of the stack frame 12 to the chassis 13 with the mounts 14 is detached, thus ensuring suppressing the deformation and the damage of the fuel cell stack 10 and the high voltage component 11.

One embodiment of the present disclosure has been described in detail above, the present disclosure is not limited to the above-described embodiments, and can be subjected to various kinds of changes of design without departing from the spirit of the present disclosure described in the claims.

For example, while the example of the ion exchanger is described as the first component of the present disclosure, as long as the high rigidity portion having the large breaking strength and the damper portion having the small breaking strength are provided, the first component is not limited to the ion exchanger. The first component may be another accessory attached to the fuel cell stack.

While the example of the radiator is described as the second component of the present disclosure, as long as a component that is disposed on the vehicle front side with respect to the first component and moves rearward of the vehicle when, for example, the vehicle collides, the second component is not limited to the radiator.

Furthermore, while the example that the mounts to join and fix the stack frame to the chassis are joined with the fastening components such as the bolts and the nuts are described, the configuration is not limited to these. As long as a structure to be detached when a predetermined impact load acts, the fastening components may be pins and the like fractured by an application of a predetermined pressure, and another mechanism such as an attachment/removal lock mechanism is usable.

What is claimed is:
1. A fuel cell vehicle comprising:
a fuel cell stack, a high voltage component, a first component, and a second component housed in a front compartment on a front side of the vehicle, the high voltage component being disposed on an upper portion of the fuel cell stack from which electric power is supplied, the first component being mounted to the fuel cell stack, the second component being disposed with a space between the first component and closer to the front side of the vehicle with respect to the first component, wherein the fuel cell stack is placed on and fixed to a stack frame fixed inside the front compartment, wherein the stack frame is joined and fixed to a chassis of the fuel cell vehicle via a mount, wherein the first component includes:
- a damper portion that deforms due to an impact load from the second component moving toward the first component to buffer the impact load from the second component when the front side of the fuel cell vehicle undergoes a collision; and
- a high rigidity portion that restricts additional deformation of the damper portion when the impact load from the second component becomes equal to or more than a predetermined magnitude, and wherein the stack frame and the chassis are joined and fixed via the mount such that the stack frame is detached from the chassis due to the impact load from the second component when the high rigidity portion restricts the deformation of the damper portion.

2. The fuel cell vehicle according to claim 1,
wherein the damper portion and the mount are disposed such that the damper portion contacts the second component prior to the mount at the collision.

\* \* \* \* \*